United States Patent [19]
Cullimore et al.

[11] Patent Number: 5,103,897
[45] Date of Patent: Apr. 14, 1992

[54] FLOWRATE CONTROLLER FOR HYBRID CAPILLARY/MECHANICAL TWO-PHASE THERMAL LOOPS

[75] Inventors: Brent A. Cullimore; Curtis W. Egan, both of Littleton; David L. Clark, Highland Ranch, all of Colo.

[73] Assignee: Martin Marietta Corporation, Bethesda, Md.

[21] Appl. No.: 710,689

[22] Filed: Jun. 5, 1991

[51] Int. Cl.⁵ .................... F28D 15/02; G05D 7/00
[52] U.S. Cl. ........................... 165/32; 165/13; 165/41; 165/104.28; 165/104.26; 23/861.08; 23/861.11; 23/861.12; 73/304 C
[58] Field of Search ............. 165/104.26, 104.31, 165/32, 40, 13, 104.28; 73/861.08, 861.11, 861.12, 304 C

[56] References Cited
U.S. PATENT DOCUMENTS

| | | | |
|---|---|---|---|
| 2,910,940 | 11/1959 | Colman et al. | 73/304 C |
| 3,866,424 | 2/1975 | Busey | 165/104.14 |
| 4,352,392 | 10/1982 | Eastman | 165/104.25 |
| 4,389,900 | 6/1983 | Gutierrez | 73/304 C |
| 4,470,450 | 9/1984 | Bizzell et al. | 165/104.25 |
| 4,492,266 | 1/1985 | Bizzell et al. | 165/104.25 |
| 4,603,732 | 8/1986 | Niggemann | 165/41 |
| 4,664,177 | 5/1987 | Edelstein | 165/1 |

OTHER PUBLICATIONS

AIAA-86-1246, Thermostatic Control of Two-Phase Spacecraft Thermal Management Systems, by B. A. Cullimore and R. C. Epper, 1986.

*Primary Examiner*—Albert W. Davis, Jr.

[57] ABSTRACT

A hybrid capillary/mechanical two-phase thermal loop has a sensor connected in parallel with a number of evaporators to regulate the flowrate of a booster pump providing working fluid to the evaporator capillaries. This sensor is made of a coiled, conductive tube connected in parallel with the evaporators, with an inside diameter substantially greater than the inside diameters of the evaporator capillaries. A conductive wire extends within said tube, but is insulated from electrical contact with the tube. The working fluid contained within the tube acts as a dielectric between the tube and wire. The amount of liquid phase working fluid within the tube can be determined by measuring the electrical capacitance between the tube and wire. The flowrate of the booster pump is then regulated as a function of the measured capacitance to maintain a substantially constant amount of liquid phase working fluid within the sensor tube. The sensor thereby effectively regulates the flowrate of working fluid from the pump to match the aggregate demand of the evaporators.

32 Claims, 3 Drawing Sheets

FLOWRATE CONTROLLER FOR HYBRID CAPILLARY/MECHANICAL TWO-PHASE THERMAL LOOPS

BACKGROUND OF THE INVENTION

1. Field of the Invention

The present invention relates generally to the field of two-phase heat transfer systems. More specifically, the present invention discloses a flowrate controller for a hybrid capillary/mechanical two-phase thermal management system.

2. Statement of the Problem

Two-phase heat transfer systems, and in particular, capillary pumped loops have substantial advantages for space applications. The basic operation of a capillary pump loop ("CPL") involves pumping a working fluid through the heat transfer system by means of the capillary forces developed in a wick material located inside the evaporator. A CPL has no moving parts and is self-controlling, in that the flow rate of working fluid through the evaporator will automatically change to match the thermal load. CPL's are ideal for managing heat loads in spacecraft where vibrations, such as those from a mechanical pump, are detrimental. In addition, CPL's offer high reliability due to the absence of moving parts. They offer automatic heat load sharing if a number of evaporators are used in parallel. Phase separation and flow distribution are automatically controlled since the flow rate through each evaporator is related directly to the rate of evaporation at the wicking surface inside. Adjacent evaporators can operate at significantly different heat input rates, but both will have only working fluid vapor at their exits. However, CPL's have disadvantages in that they cannot be readily scaled to large systems and CPL evaporators can deprime if the power loads are too high or too low.

The concept of a capillary pumped loop was developed in the mid 1960's by F. J. Stenger at the NASA Lewis Research Center (F. J. Stenger, "Experimental Feasibility Study of Water-Filled Capillary-Pumped Heat Transfer Loops," NASA TM X-1310, NASA Lewis Research Center, Cleveland, Oh., 1966). Development continued at the NASA Goddard Space Flight Center with construction of a number of CPL's beginning in the late 1970's. Several of these systems have been developed at the Goddard Space Flight Center and one has twice been flown on the space shuttle to demonstrate micro-gravity operation.

In contrast, a two-phase mechanically pumped loop ("MPL"), such as a conventional heat pump or refrigeration cycle, can be readily scaled to large, high-power applications. Aside from the additional weight, complexity and vibration provided by the pump, the other major disadvantage of an MPL is the difficulty of regulating the flowrates if a plurality of evaporators are used. A complex system of thermostats and control valves is typically employed to regulate the overall flowrate of the pump, and the flowrates through each evaporator in response to its individual thermal load.

The possibility of a hybrid capillary/mechanical thermal loop has been previously considered in which a mechanical pump boosts the pressure of the working fluid entering the evaporators, thereby effectively increasing the heat transfer capacity by permitting greater flowrates through the evaporators. However, in such a hybrid, the flowrate of the booster pump must be regulated such that the evaporators stay primed and are not flooded. Nearly all of the system pressure drops are overcome by the mechanical pump. The piping in the evaporator section need only be sized to make certain that the pressure difference across any evaporator does not exceed the pressure limit of the local capillary structure to prevent flooding or depriming of the evaporator.

The general outline of a hybrid capillary/mechanical two-phase thermal loop with a flowrate controller was previously discussed by Cullimore, et al., "Thermostatic Control of Two-Phase Spacecraft Thermal Management Systems" (AIAA/ASME 41th Joint Thermophysics and Heat Transfer Conference, June 2-4, 1986, Boston, Mass. AIAA-86-1246). Several possible embodiments were discussed in this paper. The last embodiment discussed on page 6, column 2 (see FIG. 5) mentions the possibility of using a dummy evaporator in parallel with the evaporators to monitor the liquid level in the evaporator capillaries. Capacitance sensing is noted as one possible means of monitoring the liquid level in the dummy evaporator. This dummy evaporator is described as having "a capillary structure as fine or finer than the real evaporators, and a net permeability that is less than or equal to the real evaporators." However, subsequent analysis has shown that these limitations are erroneous, and that the liquid level sensor disclosed in this paper would not function properly.

The prior art also contains several examples of two-phase heat transfer systems and capillary-pumped heat pipes, including the following:

| Inventor | U.S. Pat. No. | Issue Date |
|---|---|---|
| Busey | 3,866,424 | Feb. 18, 1975 |
| Eastman | 4,352,392 | Oct. 5, 1982 |
| Bizzell, et al. | 4,470,450 | Sep. 11, 1984 |
| Bizzell, et al. | 4,492,266 | Jan. 8, 1985 |
| Niggemann | 4,603,732 | Aug. 5, 1986 |
| Edelstein | 4,664,177 | May 12, 1987 |

Busey discloses a heat source powered by radioactive nuclear waste in which heat pipes 20 are used as a back-up safety feature to dissipate heat in the event the primary coolant loops become inoperative.

Eastman discloses a mechanically assisted evaporator surface in which liquid is pumped to and sprayed from a nozzle onto a sintered metal layer to keep the entire surface wetted at all times so as to permit uniform thin film evaporation from the surface.

Bizzell, et al., (U.S. Pat. Nos. 4,492,266 and 4,470,4350) disclose a pump-assisted heat pipe. The evaporator 12 has a capillary structure permitting evaporation of the working fluid. The condenser 13 is connected to the evaporator 12 by a conduit. Condensed working fluid is returned from the condenser 13 to the evaporator 12 by a liquid-phase pump 11. Due to the additional pressure provided by the pump, there is no limitation on the length of the heat pipe or the conduit 14 caused by capillary pumping requirements of the system.

Niggemann discloses another example of a pumped, two-phase, heat management system for spacecraft.

Edelstein discloses yet another example of a pumped, two-phase, heat transfer system. An array of independently operating grooved capillary heat exchanger plates 20 acting as evaporators are connected in parallel. A vapor line 17 interconnects the evaporators with a condenser 12. The condensed working fluid is returned with the assistance of a pump 15 from the condenser 12 to the evaporators 20. The flowrate through each evaporator 20 is separately regulated by a valve 25 controlled by the temperature of the evaporator 20.

3. Solution to the Problem

None of the prior art references show a hybrid capillary/mechanical thermal loop having a sensor (in the form of a long coiled tube containing an insulated wire) connected in parallel with the evaporators, that permits capacitive measurement of the volume of liquid phase working fluid within the tube, which is then used to regulate the flowrate of the booster pump.

SUMMARY OF THE INVENTION

This invention provides a hybrid capillary/mechanical two-phase thermal loop with a sensor connected in parallel with the evaporators to regulate the flowrate of a booster pump providing working fluid to the evaporator capillaries. This sensor is made of a coiled, conductive tube connected in parallel with evaporators, with an inside diameter substantially greater than the inside diameters of the evaporator capillaries. A conductive wire extends within said tube, but is insulated from electrical contact with the tube. The working fluid contained within the tube acts as a dielectric between the tube and wire. The relative amounts of liquid and vapor phase working fluid within the tube can be determined by measuring the electrical capacitance between the tube and wire. The flowrate of the booster pump is then regulated as a function of the measured capacitance to maintain a substantially constant amount of liquid phase working fluid within the sensor tube. The sensor thereby effectively regulates the flowrate of working fluid from the pump to match the aggregate demand of the evaporators.

A primary object of the present invention is to provide a relatively simple and inexpensive method of regulating the pump flowrate in a hybrid capillary/mechanical two-phase thermal loop.

Another object of the present invention is to provide a hybrid two-phase thermal loop that effectively combines the advantages of a capillary pump loop with the advantages of a mechanically pumped loop.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 6b is a graph showing the vapor line pressure, liquid line pressure, pump head, and capillary head in a modular arrangement such as in FIG. 6a.

DETAILED DESCRIPTION OF THE INVENTION

Figure 1:
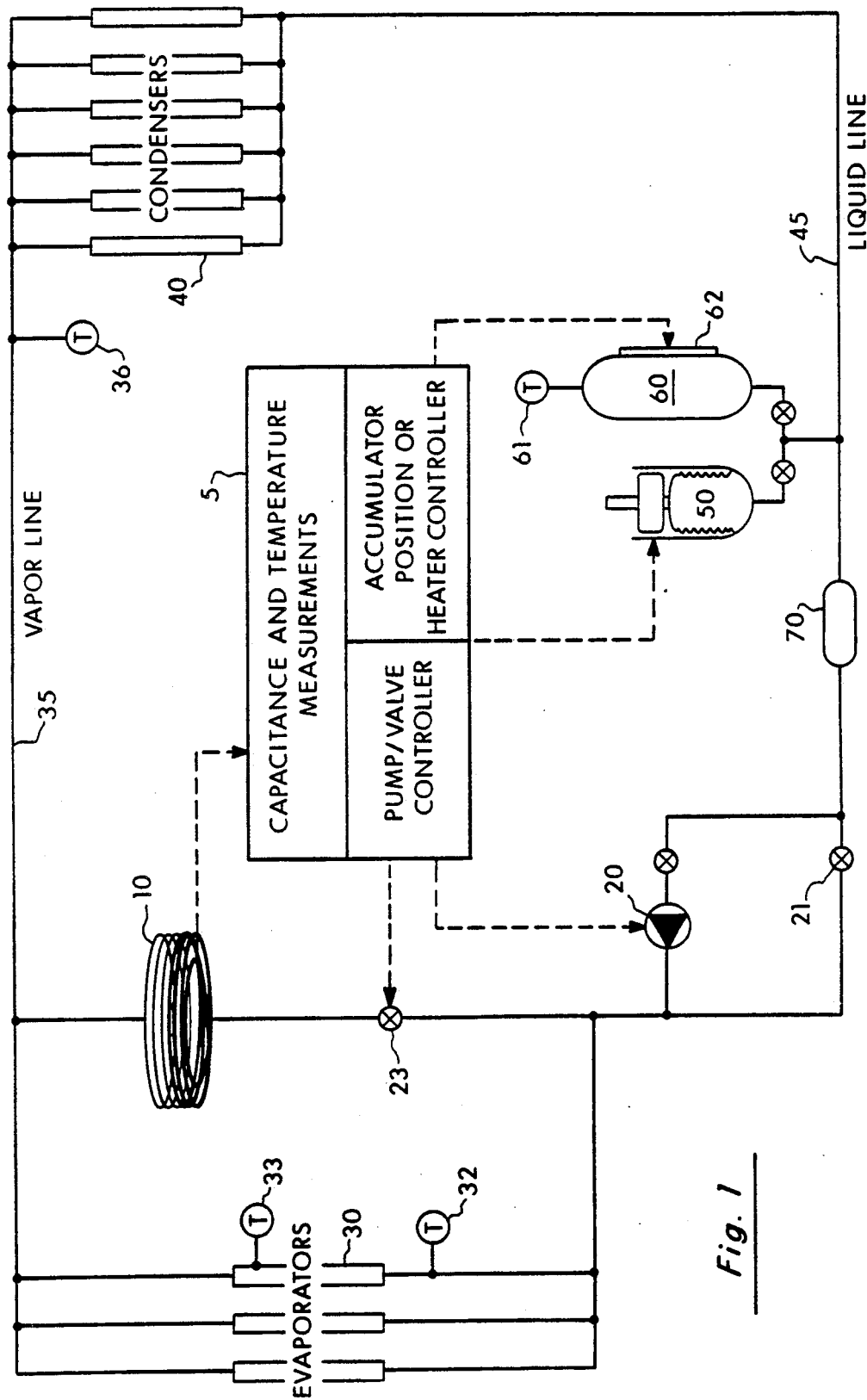
FIG. 1 is a simplified block diagram of the thermal loop in the present invention.
Figure 2:
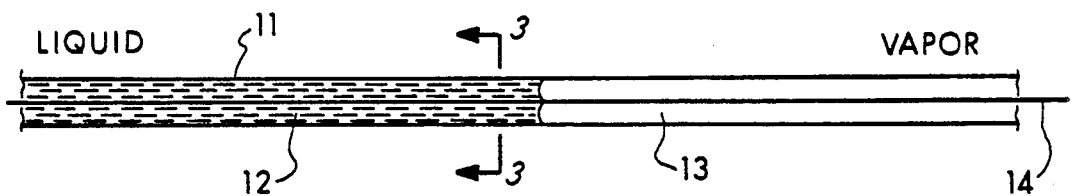
FIG. 2 is a cross-sectional view of the tube and wire used to form the evaporator demand sensor.
Figure 3:
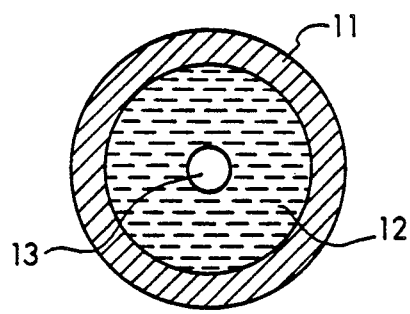
FIG. 3 is another cross-sectional view of the tube and wire used to form the evaporator demand sensor.

The basic components of the thermodynamic cycle in the present invention are shown in FIG. 1. Heat is absorbed from one or more heat sources by a series of evaporator 30 connected in parallel with one another. When used in a spacecraft, the heat sources are typically the electrical equipment, people, and other thermal sources contained within the spacecraft. A working fluid, such as ammonia, freon, or water, having a liquid phase and a vapor phase is used as the working fluid in the present invention. Liquid-phase working fluid is introduced at the inlets of the evaporators 30. Each evaporator contains a structure of wicking material 14 which functions as a multitude of capillaries in parallel with one another. The working fluid is drawn into these capillaries and is converted to its vapor phase by heat accepted by the evaporators 30 from the heat sources. The working fluid vapor exits from the evaporator capillaries into a vapor line 35 which carries the working fluid vapor to one or more condensers 40. The condensers reject heat from the working fluid to a heat sink (e.g. outer space), thereby causing substantially all of the working fluid to condense to its liquid phase. The liquid-phase working fluid is then returned by the condensers 40 to a liquid line 45. Circulation of the working fluid is driven by the pressure head (up to 0.5 psid, or 2 ft. head of ammonia at room temperatures) created across the capillaries in the evaporator 30 by capillary forces, and by a booster pump 20 connected from the liquid line 45 to the inlets of the evaporators 30.

As previously discussed, in a capillary pumped loop the thermal cycle is inherently self-regulating in that the flowrate of working fluid will automatically increase in each evaporator to match increased thermal loads placed on the evaporator. In contrast, in the present hybrid design, the capillary forces within the evaporates will tend to self-regulate, but the flowrate of the pump 20 must be actively regulated to substantially match the aggregate demand of the evaporators 30. This is accomplished in the present invention by a controller 5 which regulates the flowrate of the pump 20 to maintain a substantially constant amount of liquid phase working fluid within the control sensor 10.

The control sensor 10 is shown in greater detail in FIGS. 2-5. The sensor can be made from an elongated conductive tube 11 connected in parallel with the evaporators 30 so that the lower portion of the tube is filled with liquid phase working fluid under normal operating conditions. The portion of the tube 11 above the liquid level will typically be occupied by working fluid vapor 13. Any change in the relative amounts of liquid and vapor phase working fluid within the tube 11 is used to generate an error signal to regulate the flowrate of the pump 20 to accurately match the aggregate demand of the evaporators 30.

An insulated conductive wire 14 is placed within, and extends along the length of the sensor tube 11 to effectively form a coaxial capacitor. It should be noted that it is not necessary to radially center the wire 14 within the sensor tube 11, or to prevent contact between the insulated wire 14 and the inside surface of the sensor tube 11, provided there is no electrical short between the wire 14 and the sensor tube 11. In accordance with Gauss' law, application of a voltage across the wire 14 and sensor tube 11 will create an electromagnetic field within the sensor tube 11 regardless of the position of the wire 14 within the sensor tube 11. The working fluid (both liquid 12 and vapor 13) within the tube acts as a dielectric material between the tube 11 and the wire 14. Since the dielectric constant for working fluid liquid is substantially different from the dielectric constant for working fluid vapor, the net electrical capacitance between the tube 11 and wire 14 will vary as a function of the relative amounts of working fluid liquid and vapor present in the sensor 10. The response frequency of the sensor capacitance between the tube 11 and wire 14 is converted into a voltage proportional to the relative proportions of liquid and vapor present within the sensor tube. The relative amounts of liquid and vapor phase working fluid within the sensor can be continuously monitored with high accuracy and low hysteresis. It should be noted that a definite liquid/vapor interface may not exist within the sensor tube under some conditions (e.g. agitation or boiling). The sensor is not dependent upon the existence of a definite liquid/vapor interface, but rather measures the amount of liquid (i.e. the relative proportions of each phase) within the sensor tube. Calibration is accomplished simply by measuring the sensor capacitance at a plurality of known liquid levels (e.g. at the desired fill level, empty, and full). In the preferred embodiment, the sensor tube 11 is shaped either into a spirally wound coil or into a helically wound coil. In either case, the wire 14 tends to remain against the radially inward sections of the sensor tube wall. Other equivalent geometries for the sensor tube, such as a serpentine shape, should also work.

The sensor 10 has four functions:
1. Absorb small fluctuations in the liquid inventory caused by transient differences between the flowrates of the pump 20 and the evaporators 30;
2. Maintain separation of liquid and vapor phase working fluid;
3. Hydrodynamically isolate the evaporators from the remainder of the system by maintaining a negligibly small pressure difference between the liquid and vapor sides; and
4. Produce an electrical signal proportional to the amount of liquid within the sensor for use in feedback control of the pump 20 flowrate.

Note that the sensor 10 is adiabatic and that the time-average flowrate is zero. It is strictly a transient device. If all boundary conditions are steady, the sensor can be valved out of an operating loop with no effect.

Analysis has indicated that the sensor tube 11 should preferably have a relatively long length and an inside diameter substantially greater than the diameter of the evaporator capillaries to provide a net permeability substantially greater than the evaporators. If the diameter of the sensor is too small, the net pressure rise in the whole evaporator section will be limited by the pressure rise produced in the sensor 10, thereby reducing the scaleability and restricting possible ground test orientations. The optimum sensor tube diameter should be at least an order of magnitude larger than the evaporator capillaries in parallel with the sensor, thereby producing a negligible pressure rise. Also, the net flow resistance of the sensor (at the desired fill level) must be much less than that of the adjacent evaporators to ensure that liquid level fluctuations occur in the sensor and not in the evaporators. On the other hand, the inside diameter of the sensor tube 11 should be small enough that the liquid/vapor interface within the tube will move a long distance for a small liquid volume change, to make measurement of the interface position easier and more accurate. The sensor should be capable of functioning on the ground as well as in space for testing purposes. This places a limit on the inside diameter of the sensor tube 11, i.e. the tube must be Bond number stable to prevent liquid from running out in a gravity environment. For water, freon, or ammonia, the tube size can be no greater than approximately ⅛ to ¼ inch. This upper limit on the tube diameter places a lower limit on permeability and inertia, and affects the packaging compactness.

Figure 4:
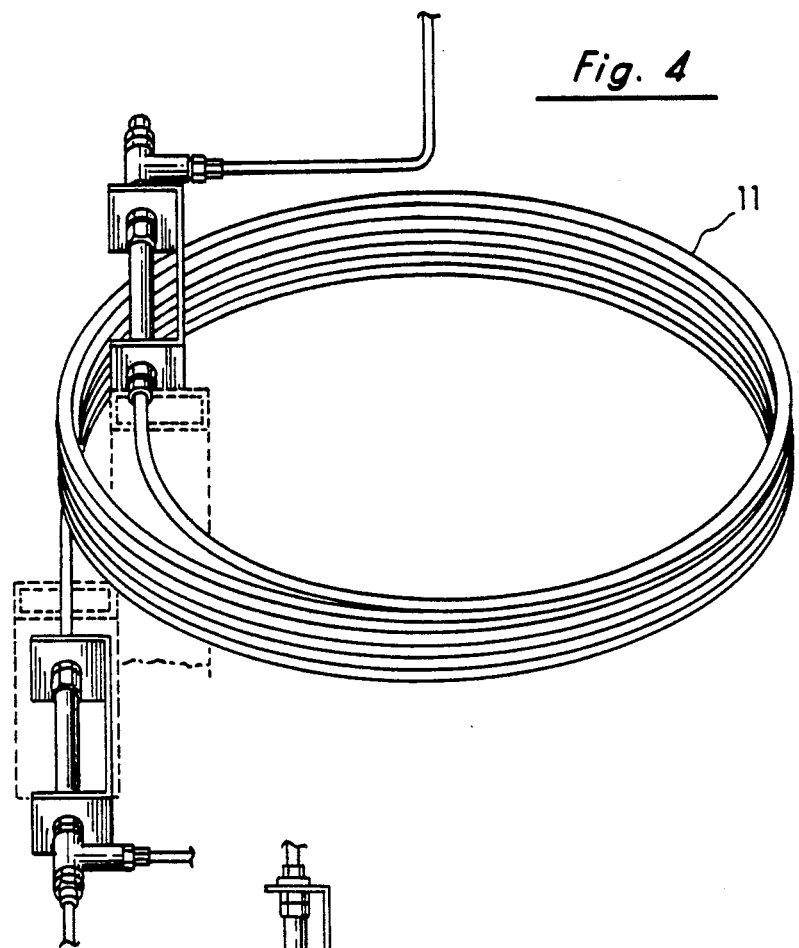
FIG. 4 is a perspective view of one embodiment of the evaporator demand sensor in the form of a helically wound coil.
Figure 5:
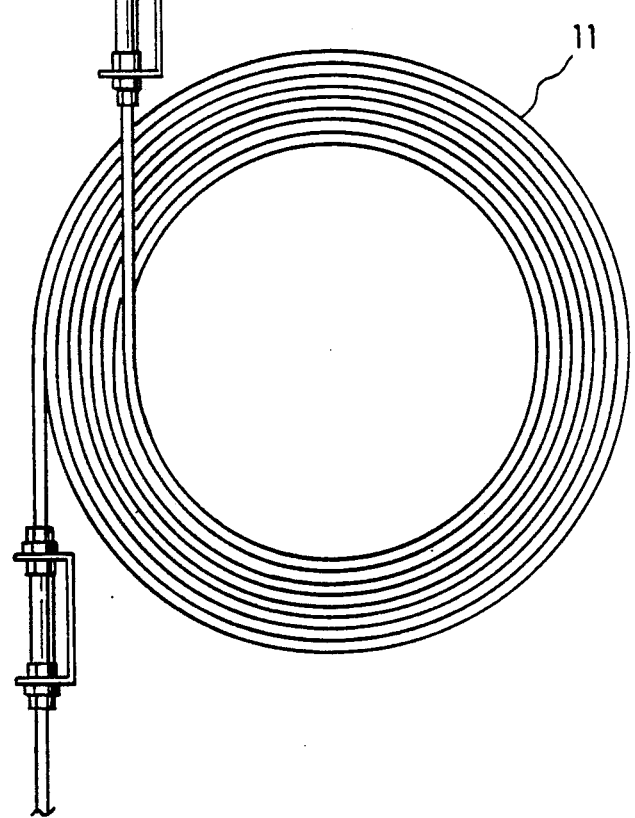
FIG. 5 is top plan view of an alternative embodiment in which the evaporator demand sensor is a spirally wound coil.

It is estimated that about 5 to 10 feet of ¼ inch tube would be required for a 10 kilowatt ammonia system. A bench-test prototype of such a system has been successfully tested with approximately 20 feet of tubing for an adequate safety margin. Due to the unwieldy length of such a sensor 10, the sensor tube is wound into a helical coil as shown in FIG. 4 to simplify packaging. Alternatively the sensor tube can be formed as a spirally wound coil as shown in FIG. 5. Couplings at either end of the sensor tube 11 allow the sensor to be connected in parallel fluid communication with the evaporators 30, and also provide electrical connections to the insulated wire 14 within the sensor tube 11.

A variable speed pump is employed in the preferred embodiment, which allows the pump flowrate to be controlled simply by proportional adjustment of the voltage supplied by the controller 5 according to the relative proportion liquid phase working fluid within the sensor 10. Roughly, the rate of change of pump discharge would be proportional to the difference between the set point and the amount of liquid measured in the sensor 10. The more liquid in the sensor 10, the faster the pump discharge is decreased. Furthermore, the rate of change of pump discharge should preferably be proportional to the rate of change in the amount of liquid within the sensor 10. If a conventional proportional-differential ("PD") control system is used to regulate the pump acceleration:

$$\frac{dw}{dt} = K_p(\alpha - 0.5) + K_d \frac{d\alpha}{dt} \tag{1}$$

where:
w = pump flowrate (proportional to voltage)
α = sensor vapor fraction (1—liquid fraction)
t = time
$K_p$ = proportional factor
$K_d$ = differential factor To achieve a critically damped system (i.e. one that returns to the initial position after a perturbation with minimum forcing and no oscillation), then:

$$K_p = \frac{K_d^2}{4\rho V_c} \tag{2}$$

where ρ is the density of the working fluid liquid, and $V_c$ is the volume of the sensor 10. Such a control system is self-correcting as long as the liquid fraction does not radically depart from a set point at approximately the 50% fill level. The optimum set point will probably be higher than 50% because it is much less catastrophic to err on the side of flooding the evaporators rather than starvation that might result in depriming the evaporators. If the thermal inertia of the system is assumed to be negligible, then the damped response frequency ω of the system is approximately:

$$\omega \approx \frac{1}{3} \frac{K_d}{\rho V_c} \quad (3)$$

For a step change in the power handled by the evaporators, the net change in the evaporator flowrate (Δw) due to the change in power (ΔP) is approximately equal to the power change divided by the heat of vaporization for the working fluid:

$$\Delta w = \frac{\Delta P}{h_{fg}} \quad (4)$$

The maximum resulting excursion in liquid/vapor level ($\alpha_{max}$) and the time ($\tau_{max}$) at which it occurs is given by:

$$\alpha_{max} = \frac{2\Delta w}{eK_d} + \frac{1}{2} \quad (5)$$

and $$\tau_{max} = \frac{2\rho V_c}{K_d} \quad (6)$$

where e is Euler's number. The optimum control system design for a critically damped system can be calculated by assuming that the maximum power change (zero to full rated power) would just fill or empty the sensor tube, as follows:

$$K_d = \frac{4}{e} |\Delta w_{max}| \quad (7)$$

and $$\tau_{sys} = \frac{e\rho V_c}{2|\Delta w_{max}|} \quad (8)$$

Note that the control response is a function only of the maximum flowrate (or power) change, while the sensor volume can be traded off against the characteristic pump response time, which is independent of the magnitude of any perturbation in the power level to the evaporators. Therefore, the larger the sensor volume, the slower the response of the control system needs to be. While a larger volume has obvious penalties, a slower control system is less likely to disrupt the capillary interface of the evaporators by abrupt changes in the pump flowrate. Furthermore, the actual thermal response time for a very fast evaporator transient is typically at least 10 seconds. Therefore, the ideal control system does not have to respond instantly. Rather, it should respond at least as fast as the fastest thermal response.

In practice, too much differential control can result in instabilities because of measurement noise and hysteresis. Fortunately, the system tolerates poor control relatively well. However, some degree of integral control is helpful. Good success has been obtained using a conventional, self-tuning proportional-integral-differential ("PID") controller.

The preferred embodiment employs a variable-speed positive displacement pump, although a variable-speed centrifugal pump should also be satisfactory. Alternatively, various combinations of pumps and values can be configured to provide a proportional flowrate. In yet another alternative embodiment, a constant flowrate pump can be used if the controller 5 is programmed to turn on the pump whenever the amount of liquid (i.e. liquid fraction) within the sensor 10 falls below a predetermined minimum limit, and turn off the pump whenever the liquid fraction rises above a predetermined maximum limit.

The system can be allowed to function as a capillary pumped loop by shutting off the pump 20, opening a bypass valve 21 in parallel with the pump 20, and closing the sensor shut-off valve 23. This reconfiguration permits working fluid to be drawn from the liquid line 45 by capillary action of the evaporators. This CPL mode of operation may be sufficient under low-load conditions and is more energy efficient.

Optionally, a reservoir 60 can be added to the liquid line 45 to hold a quantity of liquid working fluid. If a thermostatically controlled heater 62 is added to the reservoir 60, the system can be operated in a "variable conductance" mode, wherein the thermal energy source (e.g. the electronics within the spacecraft) are maintained at a given temperature independent of the evaporator load or condenser environmental variations. This serves to isolate the evaporator from a cold environment and minimize unnecessary payload heating requirements.

An accumulator 50 can be added to the liquid line 45 to provide a means of adjustably controlling the system volume. The accumulator can be implemented as a bellows with a volume controlled by a stepper motor.

A gas trap 70 can be added to the liquid line 45 to collect working fluid vapor and other non-condensible gases, and to prevent them from entering the inlets to the evaporator capillaries. Non-condensible gases are introduced during the initial vacuum charging process, and can be generated over the life of the system due to low level contamination and material incompatibilites, and by working fluid decomposition. A secondary function of the gas trap 70 may be regulation of the loop temperature, similar to the function of the reservoir. This secondary function may be assumed intermittently or continually depending upon the existence and capacity of the reservoir, and other design permutations.

The controller 5 described above can be either a simple analog circuit, a conventional PD or PID controller, or a programmable processor (e.g. a microprocessor). In addition to controlling the pump 20 flowrate, the controller can be employed to regulate other system parameters, such as the reservoir heater 62, accumulator 50, CPL-mode bypass valve 21, etc.

Figure 6A:
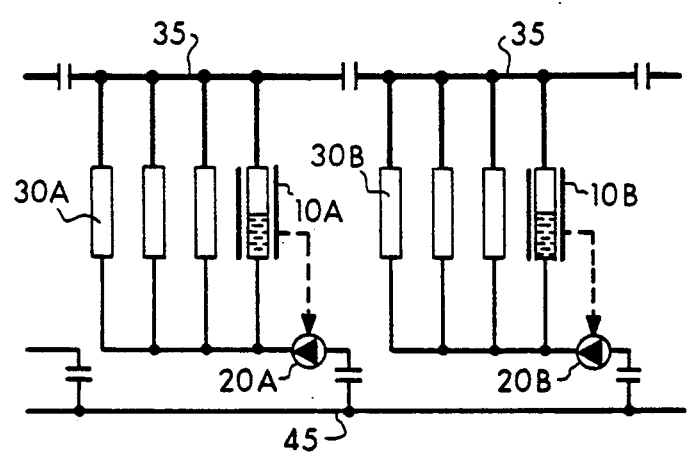
FIGS. 6a is a simplified block diagram showing the manner in which a pump and a group of evaporators can be used to create a modular section that can be repeated as needed.
Figure 6B:
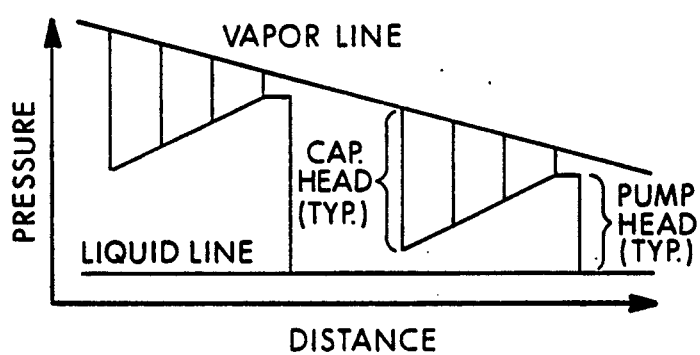

The preceding discussion has assumed a system in which a number of evaporators 30 are connected in parallel with one sensor 10 which regulates one pump 20. However, the evaporator section need not be limited by the capillary pressure rise available in a single evaporator. The architecture is amenable to modular banks of evaporators (30a, 30b) with a sensor (10a, 10b) and a booster pump (20a, 20b) for each a bank, as depicted in FIG. 6a. The corresponding pressure conditions in each bank are shown in FIG. 6b. Alternatively, the array of pumps 20a, 20b can be replaced with an array of control valves and a central pump. In yet another alternative, the pumps 20a, 20b can be plumbed in series if accumulators are added after each pump to reduce interactions between adjacent pumps.

Many other configurations of multiple evaporator arrays, sensors, and pumps are possible. For example, two arrays of evaporators can be plumbed in series with a first sensor and pump monitoring both evaporator arrays, and a second sensor and pump monitoring only the second evaporator array. In another variation, both arrays can be plumbed in series with a separate sensor for both arrays. But, unlike the previous case, the first pump is controlled by the sum of the capacitance measurements of both sensors, and the second pump is controlled only by the second sensor.

Finally, it should be noted that the present invention substantially resolves the problem of evaporator depriming associated with capillary pumped loops. In a conventional CPL, an excessive thermal load may cause an evaporator to deprime. After an evaporator is not longer primed, working fluid would no longer flow through the evaporator. In short, a CPL cannot distinguish between a deprime condition and zero load for an evaporator. In a CPL, reprime is achieved in ground tests by lowering the evaporator thermal load and heating the reservoir. Obviously, in a space flight, the load cannot readily be turned down. The present system addresses this problem by adding thermocouples 33 to permit the control 5 to monitor the temperature of the case of each evaporator 30. The controller 5 enters an "alarm mode" if an over-temperature condition is sensed at any evaporator. The temperature at which the alarm mode is triggered can be any temperature higher than the reservoir heater 62 set point. In alarm mode, the sensor shut-off valve 23 is closed, and the pump discharge is stepped up (typically, to its maximum flowrate), which floods and reprimes the evaporators. When the evaporator temperature drops below the trigger point minus a deadband value, the sensor shut-off valve 23 is reopened and controller 5 returns to its normal mode of operation.

The above disclosure sets forth a number of embodiments of the present invention. Other arrangements or embodiments, not precisely set forth, could be practiced under the teachings of the present invention and as set forth in the following claims.

We claim:

1. A closed-loop heat transfer system adapted to transfer heat from a heat source to a heat sink by means of a working fluid having a liquid phase and a vapor phase, said heat transfer system comprising:
   at least one evaporator having a plurality of capillaries adapted to accept heat from said heat source and to receive a flow of said liquid phase working fluid, with heat from said heat source causing at least a portion of said working fluid flowing through said capillaries to convert to said vapor phase;
   a condenser adapted to receive said working fluid from said evaporator, and to reject heat from said working fluid to said heat sink and thereby convert said vapor phase working fluid to its liquid phase;
   a sensor having:
   (a) a conductive tube with an inside diameter substantially greater than the inside diameters of said evaporator capillaries, connected in parallel with said evaporator;
   (b) a conductive wire extending within said tube insulated from electrical contact with said tube; and
   (c) capacitance measuring means adapted to measure the electrical capacitance between said tube and said wire and thereby indicate the amount of liquid phase working fluid within said tube; and
   a pump adapted to receive and pump liquid phase working fluid from said condenser to said evaporator, the output of said pump being regulated as a function of the capacitance measured by said capacitance measuring means to maintain a substantially constant amount of liquid phase working fluid within said sensor.

2. The heat transfer system of claim 1, wherein said sensor tube comprises a helically wound coiled tube.

3. The heat transfer system of claim 1, wherein said sensor tube comprises a spirally wound coiled tube.

4. The heat transfer system of claim 1, wherein said sensor tube comprises a serpentine tube.

5. The heat transfer system of claim 1, wherein said pump is a variable speed pump whose output is regulated as a function of the capacitance measured by said capacitance measuring means.

6. The heat transfer system of claim 1, wherein said pump is turned on whenever the amount of liquid phase working fluid measured in said sensor tube by said capacitance measuring means is below a predetermined lower limit, and said pump is turned off whenever the amount of liquid phase working fluid measured in said sensor tube is above a predetermined upper limit.

7. The heat transfer system of claim 1, wherein said wire is surrounded by a layer of electrical insulation.

8. The heat transfer system of claim 1, further comprising a bypass valve in parallel connection with said pump, adapted to permit said heat transfer system to function as a two-phase capillary pumped loop during periods when operation of said pump is not required for said evaporator to meet the thermal load of said evaporator.

9. The heat transfer system of claim 1, further comprising a reservoir adapted to receive and store a quantity of liquid phase working fluid returned from said condenser.

10. The heat transfer system of claim 9, further comprising a heater adapted to maintain a predetermined minimum saturation temperature of said liquid phase working fluid stored by said reservoir.

11. The heat transfer system of claim 1, further comprising an accumulator adapted to adjustably control the pressure of the liquid phase working fluid entering said pump.

12. The heat transfer system of claim 1, further comprising a gas trap adapted to prevent vapor phase working fluid and non-condensible gases from entering said evaporator.

13. The heat transfer system of claim 1, further comprising:
   a temperature sensor adapted to monitor the temperature of said evaporator; and
   repriming control means adapted to cause said pump to substantially increase the flowrate of working fluid to said evaporator if the temperature of said evaporator exceeds a predetermined limit.

14. The heat transfer system of claim 13, further comprising a shut-off valve closed by said repriming control means during said periods of increased pump flowrate to prevent the flow of working fluid through said sensor during said periods of increased pump flowrate.

15. A closed-loop heat transfer system adapted to transfer heat from a number of heat sources to a heat sink by means of a working fluid having a liquid phase and a vapor phase, said heat transfer system comprising:
   a plurality of evaporators connected in parallel, each evaporator having a plurality of capillaries adapted to accept heat from a heat source and to receive a flow of said liquid phase working fluid, with heat from at least one of said heat sources causing at least a portion of said working fluid flowing through said capillaries to convert to said vapor phase;

a condenser adapted to receive said working fluid from said evaporators, and to reject heat from said working fluid to said heat sink and thereby convert said vapor phase working fluid to its liquid phase;

a pump adapted to receive and pump liquid phase working fluid from said condenser to said evaporators;

a sensor having:
  (a) a conductive tube with an inside diameter substantially greater than the inside diameters of said evaporator capillaries, connected in parallel with said evaporators;
  (b) a conductive wire extending within said tube insulated from electrical contact with said tube; and
  (c) capacitance measuring means adapted to measure the electrical capacitance between said tube and said wire and thereby indicate the amount of liquid phase working fluid within said sensor tube; and control means adapted to regulate the output of said pump as a function of the electrical capacitance measured by said capacitance measuring means, to thereby maintain a substantially constant amount of liquid phase working fluid within said sensor.

16. The heat transfer system of claim 15, wherein said sensor tube comprises a helically coiled tube.

17. The heat transfer system of claim 15, wherein said sensor tube comprises a spirally wound coiled tube.

18. The heat transfer system of claim 15, wherein said sensor tube comprises a serpentine tube.

19. The heat transfer system of claim 15, wherein said wire is surrounded by a layer of electrical insulation.

20. The heat transfer system of claim 15, further comprising a bypass valve in parallel connection with said pump and a sensor shut-off valve in series connection with said sensor, adapted to permit said heat transfer system to function as a two-phase capillary pumped loop during periods when operation of said pump is not required for said evaporators to meet thermal loads.

21. The heat transfer system of claim 15, further comprising a reservoir adapted to receive and store a quantity of liquid phase working fluid returned from said condenser.

22. The heat transfer system of claim 21, further comprising a heater adapted to maintain a predetermined minimum saturation temperature of said liquid phase working fluid stored by said reservoir.

23. The heat transfer system of claim 15, further comprising an accumulator controlled by said control means, adapted to adjustably control the pressure of the liquid phase working fluid entering said pump.

24. The heat transfer system of claim 15, further comprising a gas trap adapted to prevent vapor phase working fluid and non-condensible gases from entering said evaporators.

25. The heat transfer system of claim 15, further comprising:

a temperature sensor adapted to monitor the temperature of said evaporators; and repriming control means adapted to cause said pump to substantially increase the flowrate of working fluid to said evaporators if the temperature of said evaporators exceeds a predetermined limit.

26. The heat transfer system of claim 25, further comprising a shut-off valve closed by said repriming control means during said periods of increased pump flowrate to prevent the flow of working fluid through said sensor during said periods.

27. A closed-loop heat transfer system adapted to transfer heat from a number of heat sources to a heat sink by means of a working fluid having a liquid phase and a vapor phase, said heat transfer system comprising:

a plurality of evaporators, each evaporator having an inlet and an outlet connected in parallel with the remaining evaporators, and containing a capillary structure adapted to act as a wick for liquid phase working fluid entering through said evaporator inlet, with heat from at least one of said heat sources causing at least a portion of said liquid phase working fluid to convert to said vapor phase and exit through said evaporator outlet;

a temperature sensor means adapted to monitor the temperature of said evaporators;

a condenser adapted to receive said working fluid from said evaporator outlets, and to reject heat from said working fluid to said heat sink and thereby return a substantial portion of said vapor phase working fluid to its liquid phase;

a reservoir adapted to receive and store a quantity of liquid phase working fluid returned from said condenser;

a pump adapted to receive and pump liquid phase working fluid from said condenser and said reservoir to said evaporator inlets;

a liquid sensor having:
  (a) a coiled, conductive tube with an inside diameter substantially greater than the inside diameters of said evaporator capillaries, connected in parallel with said evaporators;
  (b) a conductive wire extending within said tube insulated from electrical contact with said tube, such that working fluid acts as a dielectric material between said tube and said wire; and
  (c) capacitance measuring means adapted to measure the electrical capacitance between said tube and said wire and thereby indicate the amount of liquid phase working fluid within said tube; and control means having:
  (a) a normal mode of operation in which said control means regulates the output of said pump as a function of the electrical capacitance measured by said capacitance measuring means, to thereby maintain a substantially constant amount of liquid phase working fluid within said liquid sensor tube; and
  (b) a repriming mode of operation triggered when the temperature for any evaporator measured by said temperature sensor exceeds a predetermined limit, in which said control means causes said pump to substantially increase the flowrate of working fluid to flood said evaporators.

28. The heat transfer system of claim 27, further comprising a shut-off valve closed by said control means during said repriming mode to prevent the flow of working fluid through said liquid sensor during said repriming mode.

29. The heat transfer system of claim 27, further comprising a bypass valve in parallel connection with said pump and a sensor shut-off valve in series connection with said sensor, adapted to permit said heat transfer system to function as a two-phase capillary pumped loop during periods when operation of said pump is not required for said evaporators to meet thermal loads.

30. The heat transfer system of claim 27, further comprising a heater adapted to maintain a predetermined minimum saturation temperature of said liquid phase working fluid stored by said reservoir.

31. The heat transfer system of claim 27, further comprising an accumulator controlled by said control means, adapted to adjustably control the pressure of the liquid phase working fluid entering said pump.

32. The heat transfer system of claim 27, further comprising a gas trap adapted to prevent vapor phase working fluid and non-condensible gases from entering said evaporators.

* * * * *